(12) United States Patent
Takagi et al.

(10) Patent No.: US 7,045,921 B2
(45) Date of Patent: May 16, 2006

(54) SMALL-SIZED MOTOR

(75) Inventors: Takahiro Takagi, Maruko-Machi (JP); Yuuki Yamada, Maruko-Machi (JP)

(73) Assignees: Sanyo Seimitsu K.K., Nagano-ken (JP); Sanyo Electric Co., Moriguchi (JP)

( * ) Notice: Subject to any disclaimer, the term of this patent is extended or adjusted under 35 U.S.C. 154(b) by 0 days.

(21) Appl. No.: 10/957,586

(22) Filed: Oct. 5, 2004

(65) Prior Publication Data

US 2005/0073205 A1   Apr. 7, 2005

(30) Foreign Application Priority Data

Oct. 6, 2003   (JP) .............................. 2003-346602

(51) Int. Cl.
*H02K 5/00* (2006.01)

(52) U.S. Cl. ........................................................ 310/89

(58) Field of Classification Search ......... 310/40 MM, 310/89, 239, 154.01, 154.08; H02K 5/00

See application file for complete search history.

(56) References Cited

U.S. PATENT DOCUMENTS

| 4,409,505 | A | * | 10/1983 | Petersen ....................... 310/90 |
| 5,099,158 | A | * | 3/1992 | Stuart et al. .................. 310/14 |
| 6,081,055 | A | * | 6/2000 | Narusawa ..................... 310/81 |
| 6,522,036 | B1 | * | 2/2003 | Chen ............................ 310/58 |
| 6,594,882 | B1 | * | 7/2003 | Tanida et al. ................. 29/596 |

FOREIGN PATENT DOCUMENTS

JP   11-234943   8/1999

* cited by examiner

*Primary Examiner*—Darren E. Schuberg
*Assistant Examiner*—Nguyen Hanh
(74) *Attorney, Agent, or Firm*—Armstrong, Kratz, Quintos, Hanson & Brooks, LLP

(57) ABSTRACT

A small-sized motor of a structure not requiring any metal holder frame in a surface mounting process to a printed circuit board by reflow soldering, wherein the motor case is provided with a level flat part, a pair of left and right first side parts bent downward from this substantially perpendicularly and parallel to each other, a pair of left and right second side parts bent inward from these at an inclination of about 45°, and a pair of left and right third side parts bent down from these and parallel to each other, and a level bottom part connecting these bottom ends and extending substantially parallel to the level flat part.

10 Claims, 9 Drawing Sheets

(A)

(B)

SMALL-SIZED MOTOR

BACKGROUND OF THE INVENTION

1. Field of the Invention

The present invention relates to a vibration motor, fan motor, or other small-sized motor and, more particularly, to a small-sized motor of a structure suitable for surface mounting on a printed circuit board by reflow soldering.

2. Description of the Related Art

As a vibration motor of a structure suitable for surface mounting on a printed circuit board, as disclosed in Japanese Patent Publication (A) No. 11-234943, there is known one having a vibration motor body with an eccentric weight attached to a motor shaft, a metal holder frame provided with a motor holder for holding a motor case fit into it, and a pair of external connection terminals (motor terminals) attached to a plastic end cap for closing an opening of one end of the motor case. The level bottom of the metal holder and the pair of external connection terminals are bonded with bonding patterns and power supply patterns formed on a printed circuit board by coating cream solder for surface mounting of the vibration motor by reflow soldering.

However, the above vibration motor has had the following problems:

(1) In surface mounting of a vibration motor by reflow soldering, a special metal holder frame is required. There, an increase in the number of parts and troublesome assembly work are required and the production cost becomes higher. Further, because the metal holder frame has a pair of bent spring-holding pieces for gripping the vibration motor body and these stick out from the level bottom, extra board mounting area is consumed.

(2) Further, the plastic end cap for closing the opening of one side of the motor case requires attachment of not only the brush terminals of the inside of the motor case, but also the pair of external connection terminals (motor terminals) for connection to the power supply patterns of the printed circuit board, so an increase in the number of parts and troublesome assembly work are required and the production cost becomes higher.

SUMMARY OF THE INVENTION

A first object of the present invention is to provide a small-sized motor of a structure not requiring use of a metal holder frame in a surface mounting process using reflow soldering on a printed circuit board.

A second object of the present invention is to provide a small-sized motor using the brush terminals as the motor terminals at the end cap.

To attain the above object, the present invention provides a small-sized motor having a motor case provided with a permanent magnet at an inner surface and rotatably holding a motor shaft carrying an armature via a bearing and a plastic end cap fit into an opening at one end side of the motor case and having a pair of brush assemblies attached, the motor case comprised of a level flat part, a pair of left and right symmetric side parts bent from that level flat part, and a level bottom part connecting the bottom ends of the pair of side parts and substantially parallel to the level flat part.

Preferably, each of the side parts is comprised of a first side part bent down substantially perpendicularly from the level flat part, a second side part inclined bent inward from the first side part, and a third side part bent down from the second side part.

Preferably, a center of rotation position of said armature is offset to the level flat part side from a position of a center point of a distance separating the level flat part and the level bottom part and a space is provided between the permanent magnet and the level bottom part.

More preferably, the plastic end cap has an insertion spacer for insertion into the space.

Preferably, the permanent magnet is an irregularly shaped cylindrical member with an outer circumference abutting against an inside surface of the motor case.

More preferably, the outer circumference is a regular octagonal shape.

Preferably, the motor case has a cutaway part not provided with the second and third side parts and the level bottom part at the bottom of the first side part at the one end side, each brush assembly is provided with a brush terminal having a brush affixed to it, and the brush terminal has a stop part for attachment to the plastic end cap and is formed sticking out to the outside of the motor case through the cutaway part.

More preferably, each brush terminal has a bent part matching a level surface of the flat bottom part.

More preferably, the pair of bent parts face each other inward.

Preferably, part of the motor shaft projecting outward from the bearing has an eccentric weight attached to it.

BRIEF DESCRIPTION OF THE DRAWINGS

These and other objects and features of the present invention will become clearer from the following description of the preferred embodiments given with reference to the attached drawings, wherein:

FIG. 5A is a plan view of this embodiment, while FIG. 5B is a bottom view of this embodiment;

DESCRIPTION OF THE PREFERRED EMBODIMENTS

Figure 1:
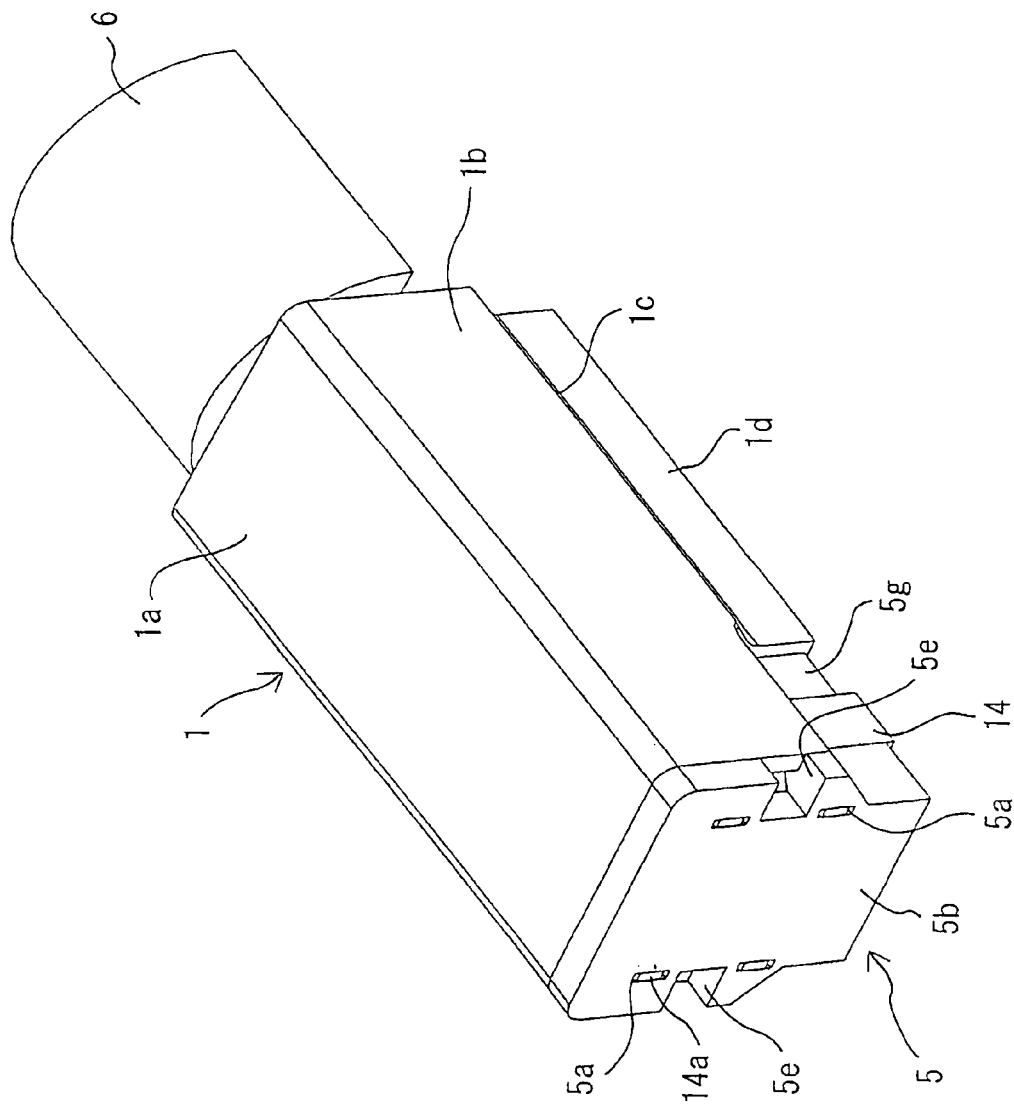
FIG. 1 is a perspective view of a small-sized motor according to an embodiment of the present invention.

Preferred embodiments of the present invention will be described in detail below while referring to the attached figures.

To achieve the first object, the present invention provides a small-sized motor having a motor case provided with a permanent magnet at an inner surface and rotatably holding a motor shaft carrying an armature via a bearing and a plastic end cap fit into an opening at one end side of the motor case and having a pair of brush assemblies attached. This is characterized by the special structure of the motor case.

The motor case is comprised of a level flat part, a pair of left and right symmetric side parts bent from that level flat part, and a level bottom part connecting the bottom ends of the pair of side parts and substantially parallel to the level flat part.

If using a motor case of this structure, it is possible to bond the level bottom part to the bonding patterns of a printed circuit board by coating cream solder, so it is possible to surface mount a small-sized motor on a printed circuit board in a horizontal state, no metal holder frame need be used, and costs can be lowered. Further, because the flat part of the motor case is level, it is possible to pick up by suction the level flat part by robot handling, so it is possible to automate the process of mounting small-sized motors on printed circuit boards and to reduce labor.

Each of the side parts preferably is comprised of a first side part bent down substantially perpendicularly from the level flat part, a second side part inclined bent inward from the first side part, and a third side part bent down from the second side part. Due to the inwardly inclined second side parts, the level bottom part is narrower in width than the level flat part, but a sufficient bonding strength can be obtained due to the reduction of weight by the amount of the metal holder frame. Further, because the first side parts are bent down substantially perpendicularly from the level flat part, excess area on the board need not be occupied.

When the center of rotation position of the armature is offset to the level flat part side from a position of a center point of a distance separating the level flat part and the level bottom part and a space is provided between the permanent magnet and the level bottom part, due to the presence of this space, it is possible to suppress the action of demagnetization of the permanent magnet due to the heat of melting of the cream solder occurring at the level bottom part.

Further when the plastic end cap has an insertion spacer for insertion into the space, the permanent magnet can be held in position.

As the permanent magnet, it is preferable to use an irregularly shaped cylindrical member with an outer circumference abutting against an inside surface of the motor case. It is therefore possible to facilitate assembly of the permanent magnet and hold its position. More preferably, the outer circumference is a regular octagonal shape. Because the level flat part and the left and right first and second side parts abut against a total of five faces of the regular octagonal shape, the position can be held better. Still more preferably, if making the shape circular, the thickness of the permanent magnet can be made greater and more uniform compared with a regular octagonal shape.

To achieve the second object, the motor case has a cutaway part not provided with the second and third side parts and the level bottom part at the bottom of the first side part at the one end side, each brush assembly is provided with a brush terminal having a brush affixed to it, and the brush terminal has an engagement part for attachment to the plastic end cap and is formed sticking to the outside of the motor case through the cutaway part. Because the motor case is provided with the inclined second side parts, by removing part of the second side parts, it is possible for the brush terminals to stick out from the motor case through the cutaway part. There is therefore no longer a need to attach motor terminals as external connection terminals to the plastic end cap and the costs can be lowered. More preferably, each brush terminal has a bent part matching a level surface of the flat bottom part. In this case, the stability when mounting a small-sized motor to a board becomes better and the bonding strength can be improved. Preferably, the pair of bent parts face each other inward. This contributes to a reduction of the area occupied on the board.

When part of the motor shaft projecting outward from the bearing has an eccentric weight attached to it, the center of rotation position of the armature is offset to the level flat part side from a position of a center point of a distance separating the level flat part and the level bottom part, so the diameter of rotation of the eccentric weight becomes greater than even the distance separating the level flat part and the level bottom part (thickness of motor case) and a vibration motor with a high inertia efficiency and high vibration strength can be realized.

Note that the part of the motor shaft projecting out from the bearing may have a fan attached to it.

Figure 2:
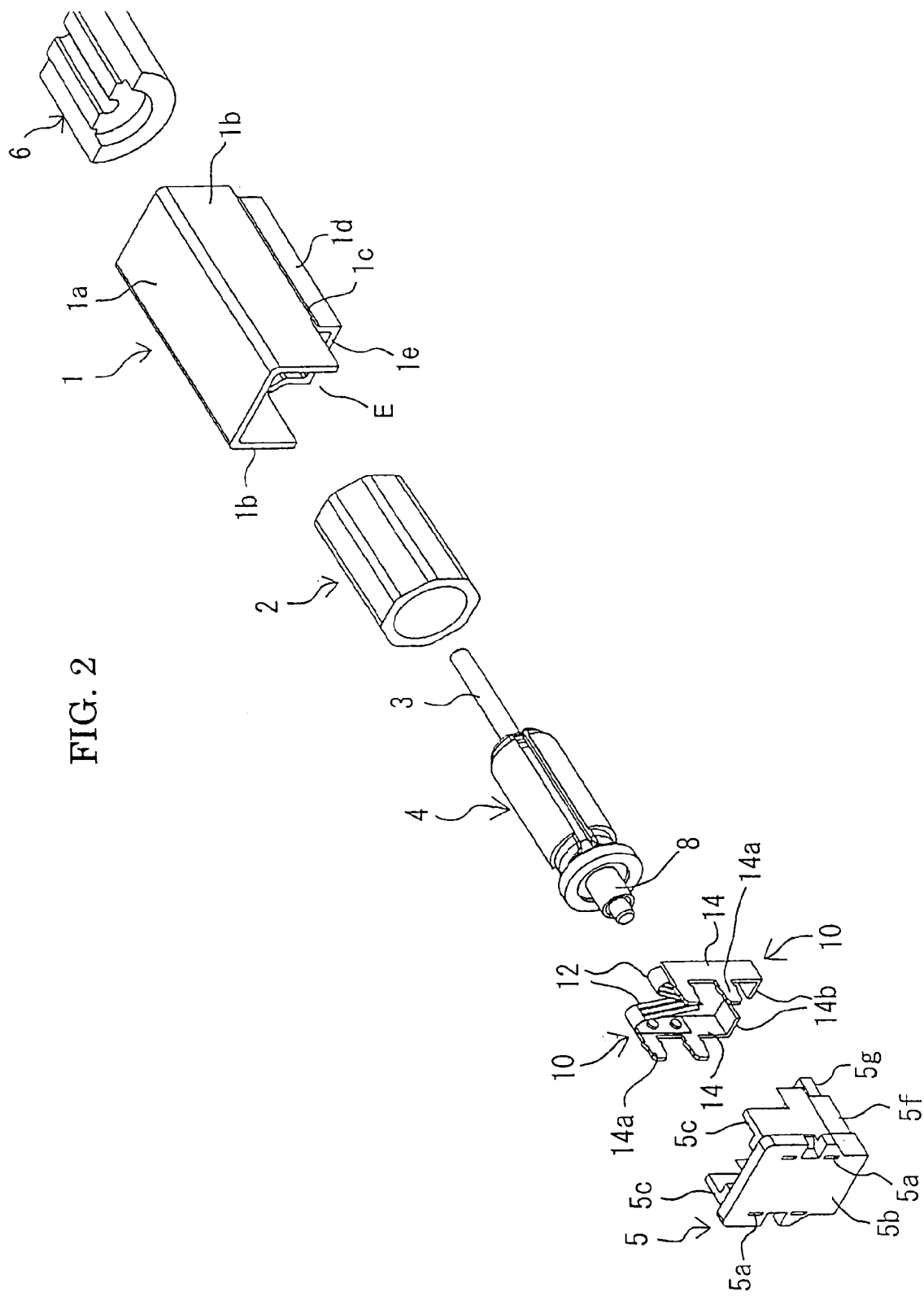
FIG. 2 is a disassembled perspective view of this embodiment.
Figure 3:
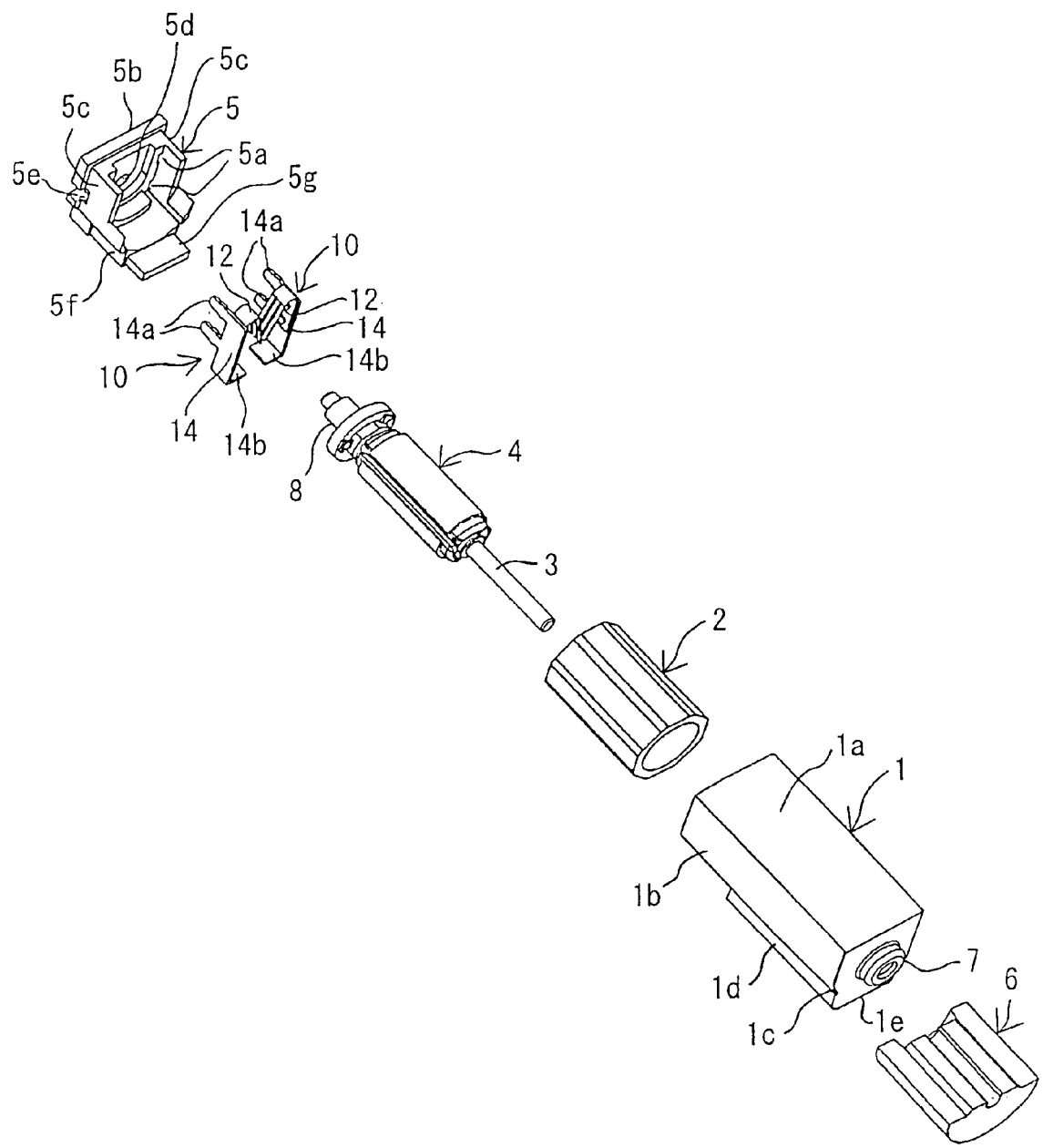
FIG. 3 is a disassembled perspective view of this embodiment seen from Another angle.
Figure 4:
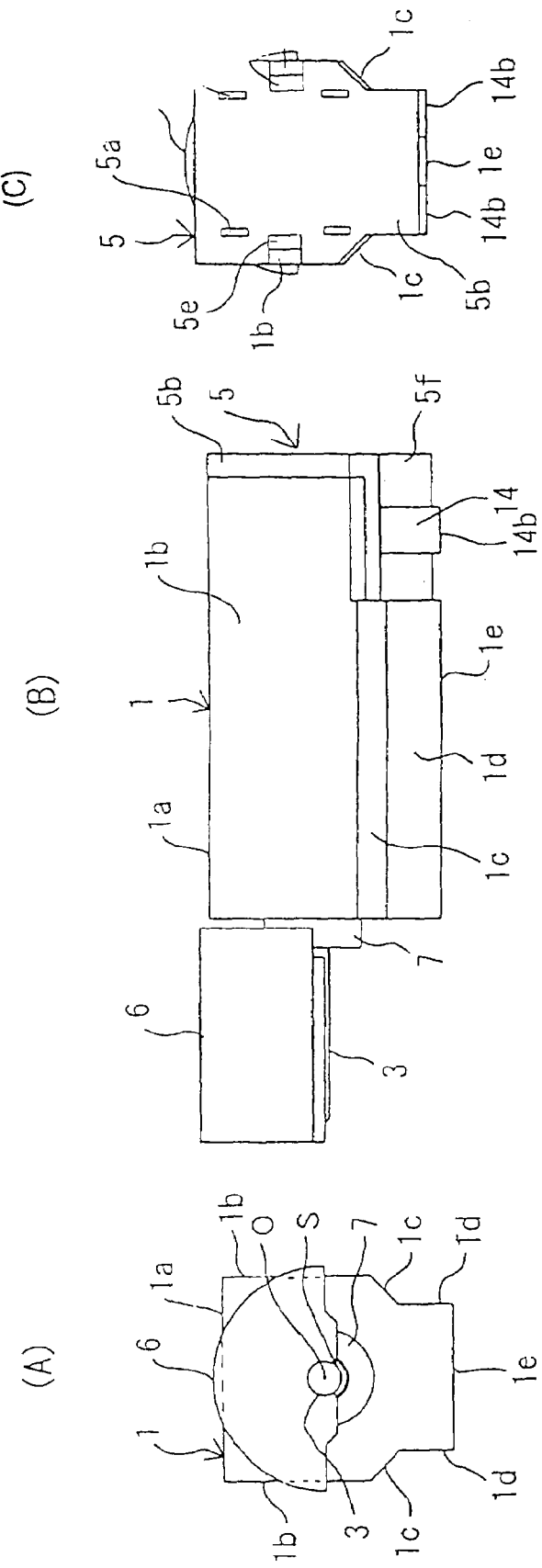
FIG. 4A is a front view of this embodiment.
FIG. 4B is a side view of the embodiment.
FIG. 4C is a back view of the embodiment.
Figure 5:
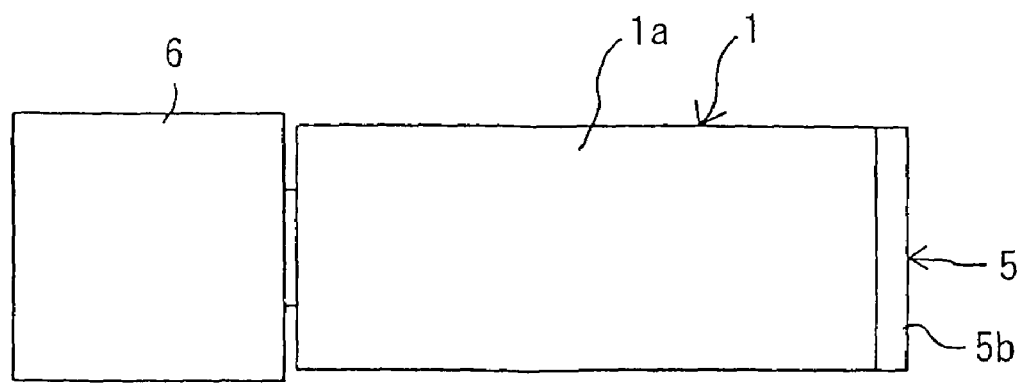
Figure 5:
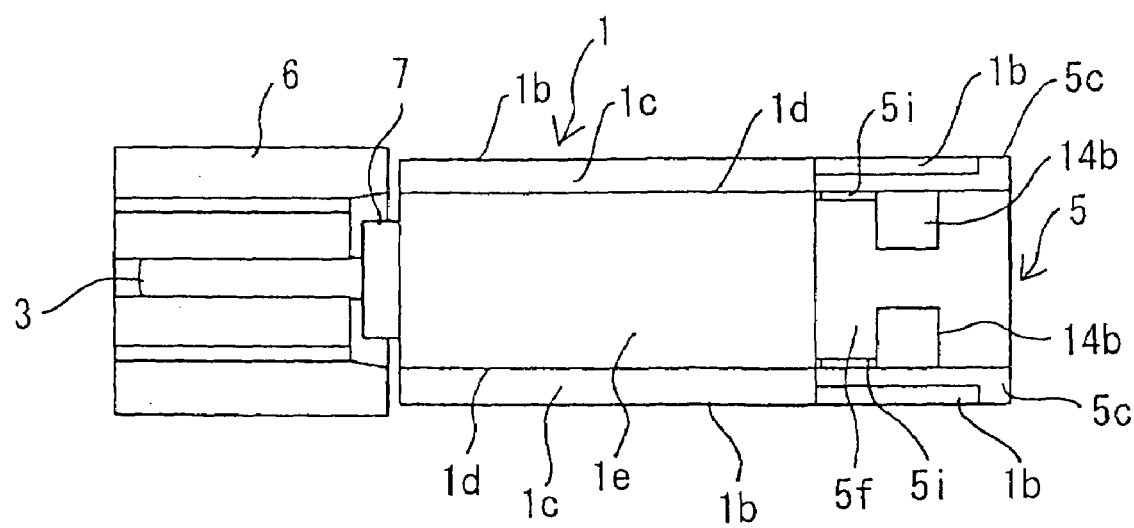
Figure 6:
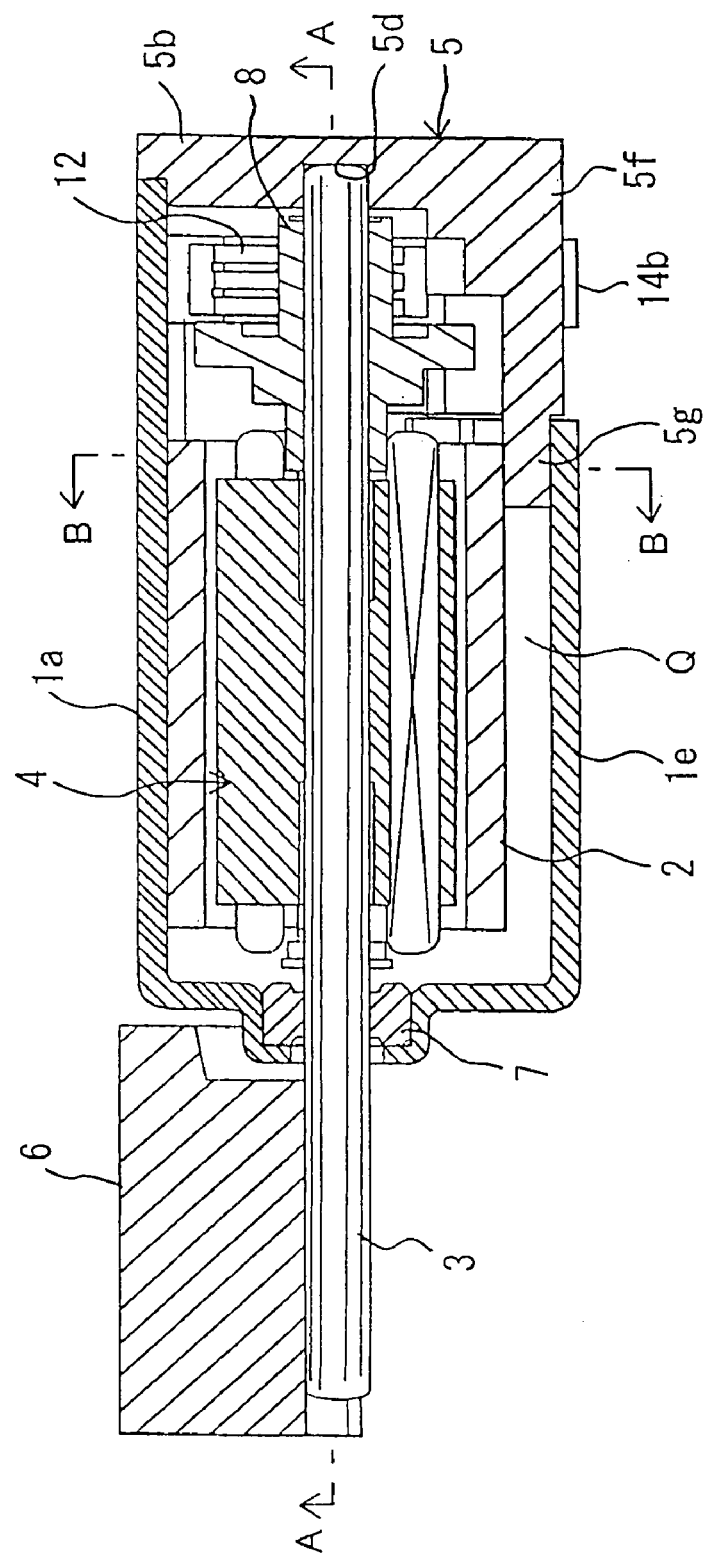
FIG. 6 is a vertical sectional view of this embodiment.
Figure 7:
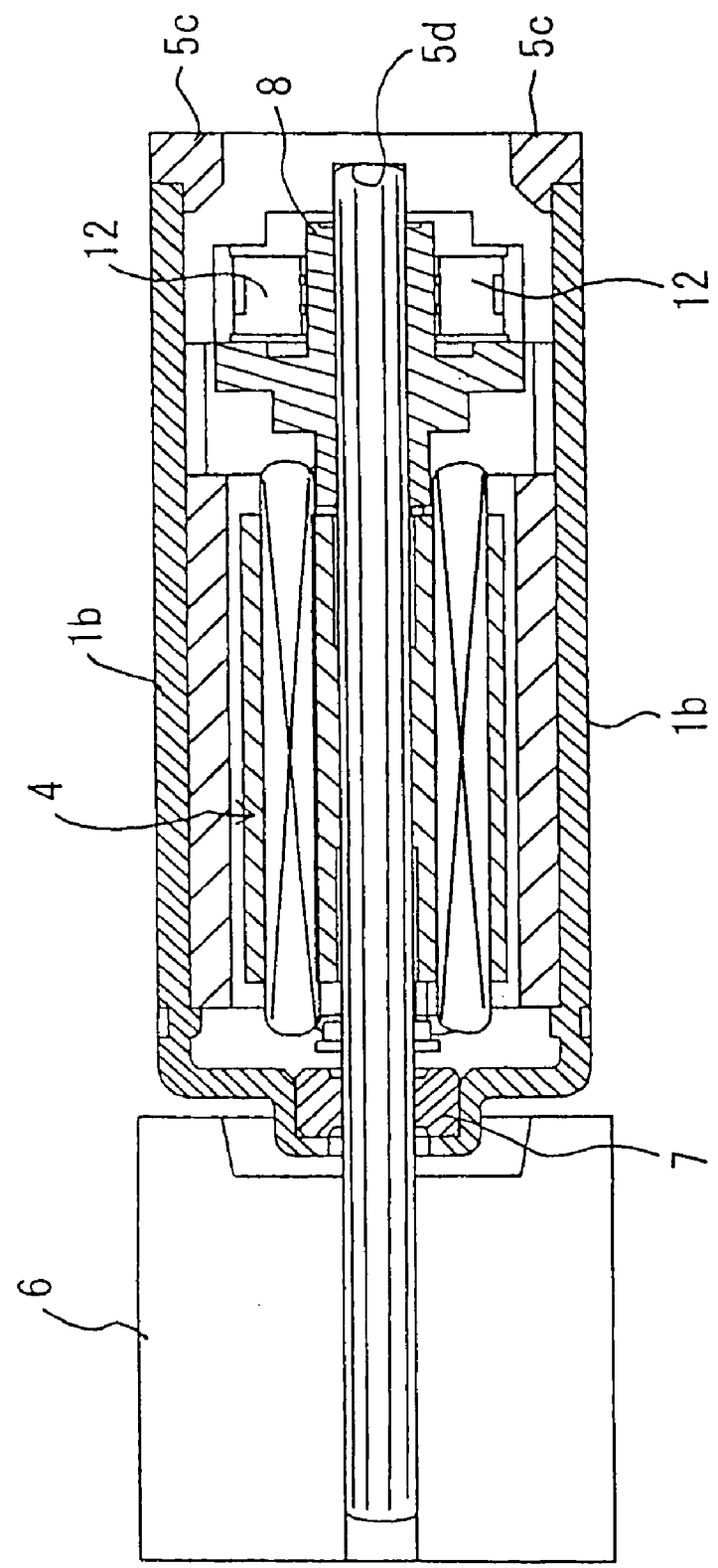
FIG. 7 is a perspective view showing the state cut along the line A—A of FIG. 6.
Figure 8:
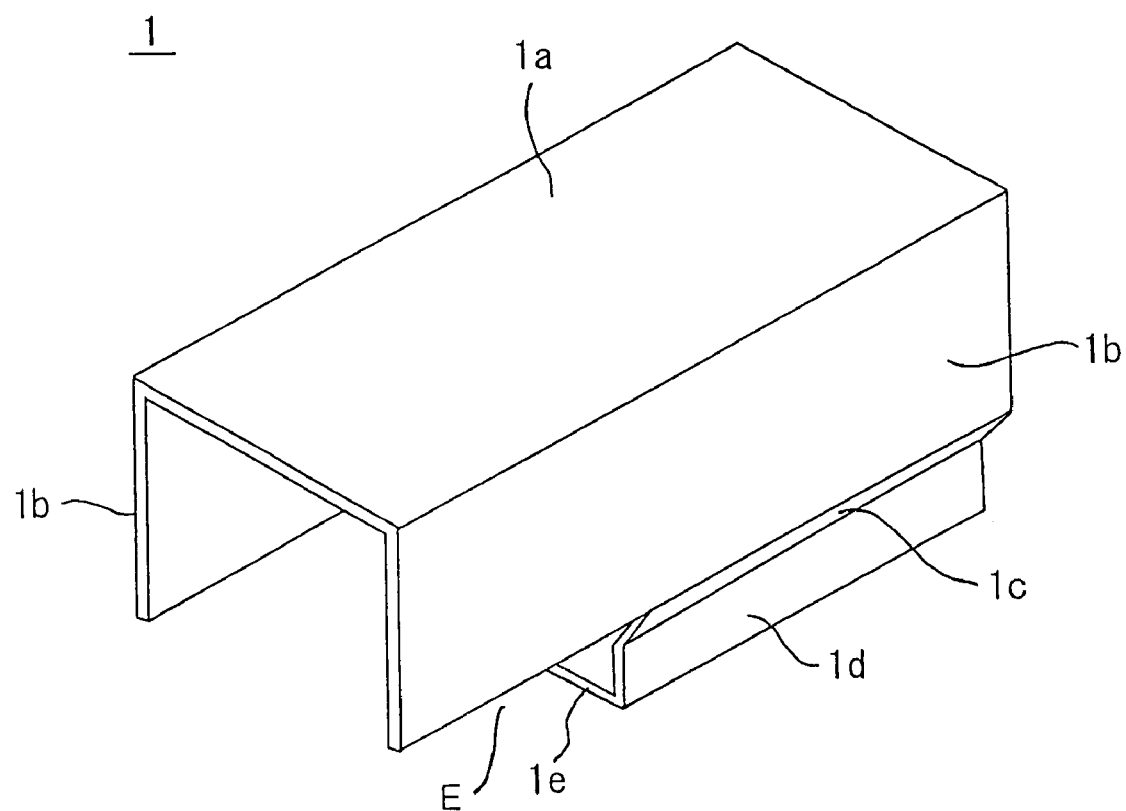
FIG. 8 is a perspective view of a motor case in this embodiment.
Figure 9:
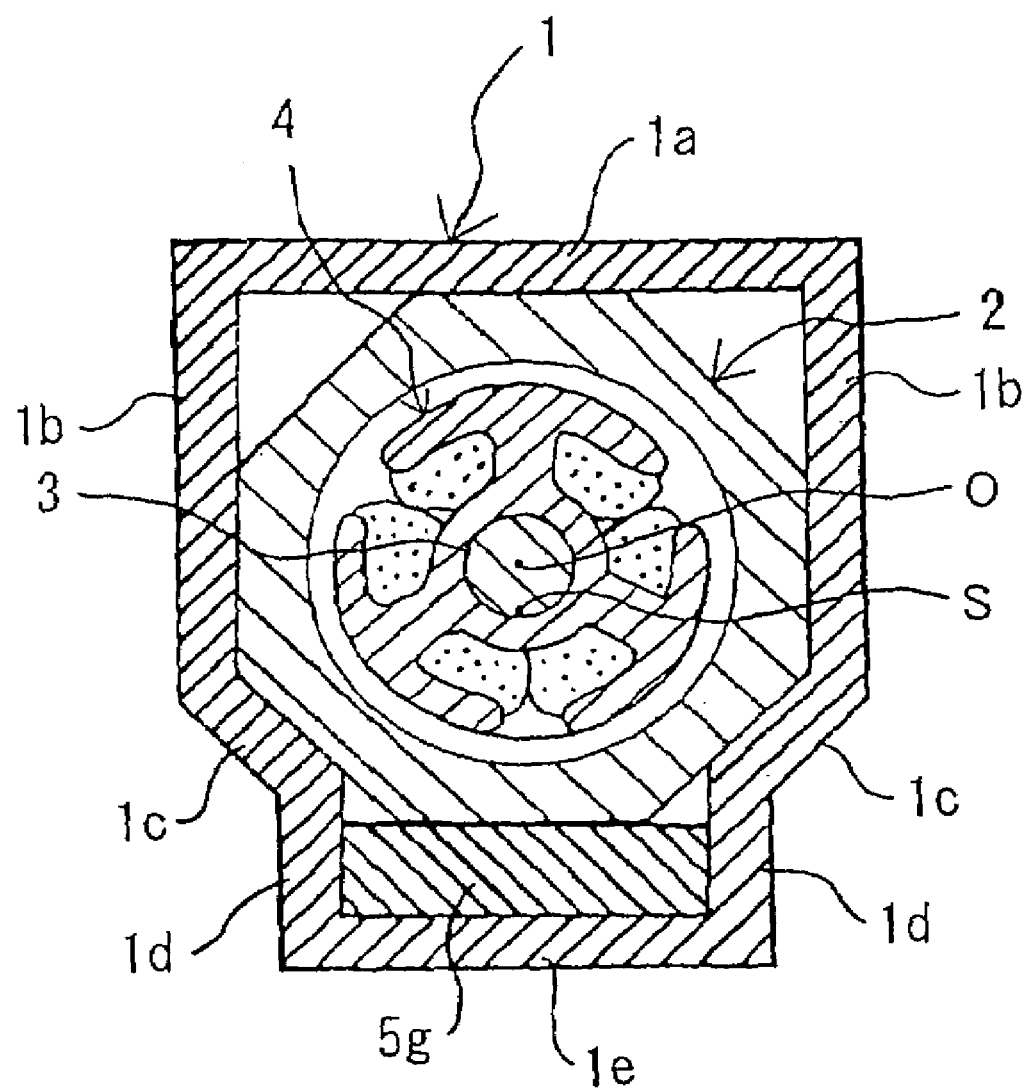
FIG. 9 is a perspective view showing the state cut along the line B—B of FIG. 6.

FIG. 1 is a perspective view of a small-sized motor according to an embodiment of the present invention; FIG. 2 is a disassembled perspective view of this embodiment; FIG. 3 is a disassembled perspective view of this embodiment seen from another angle; FIG. 4A is a front view of this embodiment, FIG. 4B is a side view of the embodiment, and FIG. 4C is a back view of the embodiment; FIG. 5A is a plan view of this embodiment, while FIG. 5B is a bottom view of this embodiment; FIG. 6 is a vertical sectional view of this embodiment; FIG. 7 is a perspective view showing the state cut along the line A—A of FIG. 6; FIG. 8 is a perspective view of a motor case in this embodiment; and FIG. 9 is a perspective view showing the state cut along the line B—B of FIG. 6.

The small-sized motor of this example is a vibration motor and has an irregular sectional shape motor case 1, a cylindrical permanent magnet 2 positioned at its inside, a three-pole armature 4 through which the motor shaft 3 is press fit, a pair of brush assemblies 10, 10 assembled into the plastic end cap 5 serving also as a brush board, and an eccentric weight 6 fastened to a part of the motor shaft 3 sticking out from the motor case 1.

The motor case 1 is a deep-drawn and press-formed part made of iron has a metal bearing 7 press-fit into a bearing part at the top and is comprised of a level flat part 1a, a pair of left and right first side parts 1b, 1b bent down substantially perpendicularly from the level flat part 1a and substantially parallel, a pair of left and right second side parts 1c, 1c bent inward from the pair of left and right first side parts 1b, 1b and inclined about 45°, a pair of left and right third side parts 1d, 1d bent down from the pair of left and right second side parts 1c, 1c, and a level bottom part 1e connecting the bottom ends of the pair of left and right third side parts 1d, 1d and extending substantially parallel with the level flat part 1a. The motor case 1 has a cutaway part E not provided with the second side parts 1c, 1c, third side parts 1d, 1d, and level bottom part 1e at the bottom of the first side parts 1b, 1b at the open side of its one end. The distance separating the level flat part 1a and the level bottom part 1e is longer than the distance separating the pair of left and right first side parts 1b, 1b. The center of rotation position O of the motor shaft 3 is offset to the level flat part 1a side from the position S of the center point of the distance separating the level flat part 1a and the level bottom part 1e. The amount of offset is kept within substantially the radius of the motor shaft 3.

The cylindrical permanent magnet has a regular octagonal outer circumference. This cylindrical permanent magnet 2 is inserted into the motor case 1 from the opening at one end of it. The cylindrical permanent magnet 2 abuts against the inside surfaces of the level flat part 1a, first side parts 1b, 1b, and second side parts 1c, 1c. A space Q of at least the thickness of the level bottom part 1e is formed between the permanent magnet 2 and level bottom part 1e as shown in FIG. 6.

Each brush assembly 10 is provided with a brush 12 in sliding contact with the commutator 8 and brush terminal 14 attached to this. The brush terminal 14 has a pair of engagement tabs 14a, 14a for insertion into engagement holes 5a of the plastic end cap 5 and bent parts 14b serving as foot parts at the bottom ends.

The electrically insulating plastic end cap 5 has, integrally, side parts 5c, 5c sticking out from an end plate 5b in the axial direction, fit in the inside surfaces of the open sides of the first side parts 1b, 1b of the motor case 1, and facing each other, a bearing hole 5d formed at the center of the inside of the end plate 5b, notches 5e, 5e for fastening parts of the open edges of the first side parts 1b, 1b, slits 5i, 5i into which the brush terminals 14 are inserted as shown in FIG. 5B, a bottom part 5f closing the cutaway part E facing the level flat part 1a at the open side, and a spacer 5g sticking out further from the bottom part 5f in the axial direction and partially inserted into the space Q.

Each brush terminal 14 sticks out at the bottom side of the motor case 1 through the cutaway part E. Bent parts 14b, 14b match the level surface of the level bottom part 1e and face inward facing each other. The bottom parts 5f pass over the bent parts 14b, 14b.

If using the motor case 1 of this example, the level bottom part 1e can be bonded tightly to the bonding patterns of the printed circuit board by coating cream solder, so the small-sized motor can be surface mounted to the printed circuit board in a horizontal state, no metal holder frame need be used, and the cost can be lowered. The level bottom part 1e is narrower in width than the level flat part 1a due to the inwardly inclined second side parts 1c, but the bonding strength can be obtained due to the reduction in weight by the amount of the metal holder frame. Further, because the first side parts 1b are bent down substantially perpendicularly from the level flat part 1a, no extra area need be occupied on the board. Further, because the motor case 1 has a level flat part 1a, the level flat part 1a can be gripped by suction by robot handling, so the process of mounting small-sized motors to printed circuit boards can be automated and labor can be saved.

Because the center of rotation position O of the armature 4 is offset to the level flat part 1a side from the position S of the center point of the distance separating the level flat part 1a and the level bottom part 1e and a space Q is provided between the permanent magnet 2 and the level bottom part 1e, it is possible to suppress the action of demagnetization of the permanent magnet 2 due to the heat of melting of the cream solder occurring in the level bottom part 1e.

The plastic end cap 5 has an insertion spacer 5g partially inserted into the space Q, so the permanent magnet 2 can be held in position. Further, because the permanent magnet 2 has a regular octagonal outer circumference, the level flat part 1a and side parts 1b, 1c abut against a total of five faces of the regular octagon.

The motor case 1 is provided with inclined second side parts 1c, so by partially removing the second side parts 1c, it is possible to make the brush terminals 14 stick out from the motor case through the cutaway part E. The plastic end cap 5 does not have to have motor terminals attached to it as external connection terminals and therefore costs can be reduced. The brush terminals 14 have bent parts 14b matching with the level surface of the level bottom part 1e, so the stability when placing the small-sized motor on a board becomes good and the bonding strength can be improved.

Further, because the pair of bent parts 14b, 14b face each other inward, this contributes to a reduction of the area occupied on the board.

In the vibration motor of this example, because the center of rotation position O of the armature 4 is offset to the level flat part 1a side from the position S of the center point of the distance separating the parts, even if the diameter of rotation of the eccentric weight 6 is made longer than the distance separating the level flat part 1a and the level bottom part 1e (thickness of motor case 1), the weight will not contact the printed circuit board, the inertia efficiency will be high, and the vibration strength can be raised.

Summarizing the effects of the invention, because it is fastened to a printed circuit board at the level bottom part of the motor case, the small-sized motor can be surface mounted in a horizontal state, no metal holder frame need be used, and the cost can be lowered. Further, because the level flat part can be gripped by suction by robot handling, the process of mounting small-sized motors to printed circuit boards can be automated and labor can be saved.

While the invention has been described with reference to specific embodiments chosen for purpose of illustration, it should be apparent that numerous modifications could be made thereto by those skilled in the art without departing from the basic concept and scope of the invention.

What is claimed is:

1. A small-sized motor having a motor case provided with a permanent magnet at an inner surface and rotatably holding a motor shaft carrying an armature via a bearing and a plastic end cap fit into an opening at one end side of the motor case and having a pair of brush assemblies attached, said motor case comprising a level flat part, a pair of left and right side parts bent from that level flat part, and a level bottom part connecting the bottom ends of the pair of side parts and substantially parallel to the level flat part, wherein each one of such pair of left and right side parts consists of a plurality of symmetric flat parts.

2. A small-sized motor as set forth in claim 1, wherein each of said side parts comprises a first side flat part bent down substantially perpendicularly from the level flat part, a second side flat part inclined bent inward from said first side flat part, and a third side flat part bent down from said second side flat part.

3. A small-sized motor as set forth in claim 1, wherein a center of rotation position of said armature is offset to the level flat part side from a position of a center point of a distance separating said level flat part and said level bottom part and a space is provided between said permanent magnet and said level bottom part.

4. A small-sized motor as set forth in claim 3, wherein said plastic end cap has an insertion spacer for insertion into said space.

5. A small-sized motor as set forth in claim 2, wherein said permanent magnet is an irregularly shaped cylindrical member with an outer circumference abutting against an inside surface of said motor case.

6. A small-sized motor as set forth in claim 5, wherein said outer circumference is a regular octagonal shape.

7. A small-sized motor as set forth in claim 2 wherein said motor case has a cutaway part not provided with said second and third side parts and said level bottom part at the bottom of said first side part at said one end side, each brush assembly is provided with a brush terminal having a brush affixed to it, and said brush terminal has a stop part for attachment to said plastic end cap and is formed sticking out to the outside of said motor case through said cutaway part.

8. A small-sized motor as set forth in claim 7, wherein each brush terminal has a bent part matching a level surface of said flat bottom part.

9. A small-sized motor as set forth in claim 8, wherein said pair of bent parts face each other inward.

10. A small-sized motor as set forth in claim 1, wherein part of said motor shaft projecting outward from said bearing has an eccentric weight attached to it.

* * * * *